July 28, 1936. H. FRIEDRICH 2,048,739
POWER SUPPLY CIRCUIT
Filed Nov. 29, 1933

INVENTOR
HANS FRIEDRICH
BY
ATTORNEY

Patented July 28, 1936

2,048,739

UNITED STATES PATENT OFFICE 2,048,739

POWER SUPPLY CIRCUIT

Hans Friedrich, Berlin, Germany, assignor to Telefunken Gesellschaft für Drahtlose Telegraphie m. b. H., Berlin, Germany, a corporation of Germany Application November 29, 1933, Serial No. 700,167 In Germany December 20, 1932

5 Claims. (Cl. 250—27)

For insuring satisfactory operating of amplifier tubes it is imperative that the biasing voltage fed to the electrodes should be as constant and stable as possible. This is particularly important when pentodes are employed in the power stage, for here proper stabilization of the screen-grid voltage is required if maximum tube power is to be obtained. Inasmuch as this screen-grid voltage, in the usual present day commercial type of tube, is lower than the plate potential, recourse is had to voltage dividers. Now, it has been discovered that the properties of the tubes used are subject to wide discrepancies, so much so indeed that the screen-grid current of different tubes of like type varies occasionally at the ratio of 1:4, a fact that is in all likelihood ascribable to variations in emission. These marked fluctuations together with the demand that the biasing voltage should be strictly stabilized, require a voltage divider whose current is large compared with the screen-grid current, say, from two to three times larger than the maximum screen-grid current. The power pack is called upon to furnish not only the plate current and the screen-grid current, but also a voltage-divider current of a size like the plate current. It is therefore necessary, merely for producing or making available the screen-grid biasing potential, to employ larger rectifiers and also larger network transformers than would really be necessary looked at from the angle of the energies to be furnished.

Now according to this invention, these drawbacks are avoided by that for the production of the plate potential, recourse is had to what is known in the earlier art as the Greinacher scheme, and that from the condenser midpoint then is directly tapped the voltage for the auxiliary electrode, say, the screen-grid. In this manner, the large energy which the power pack is required to furnish is reduced.

Figure 1:
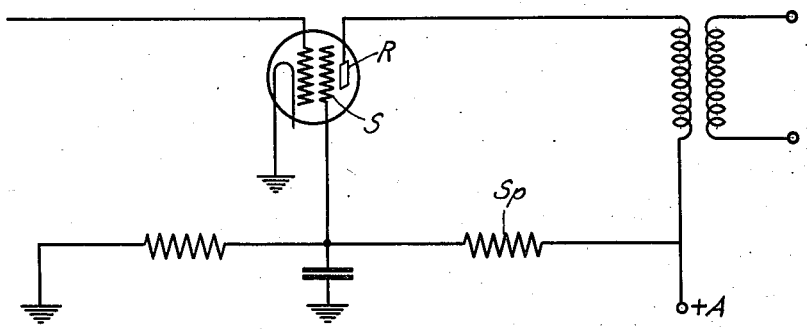
Figure 2:
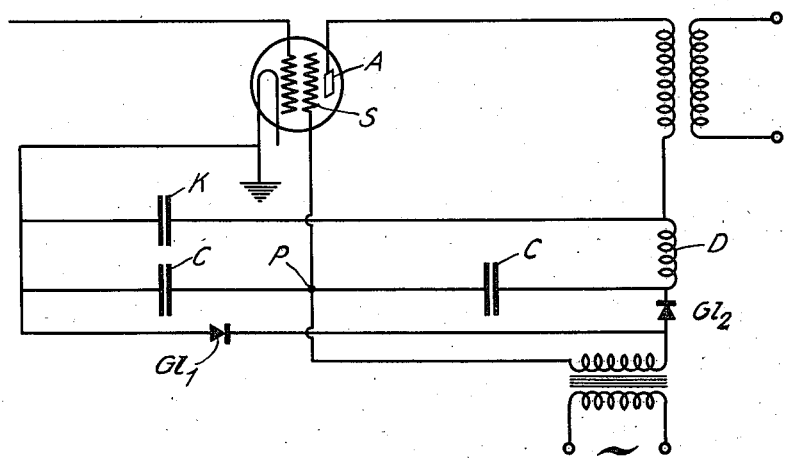

The drawing serves to illustrate the basic idea of the invention. Fig. 1 is the circuit scheme heretofore used; and, Figs. 2 and 3 exemplify embodiments of an arrangement according to the invention.

Figure 3:
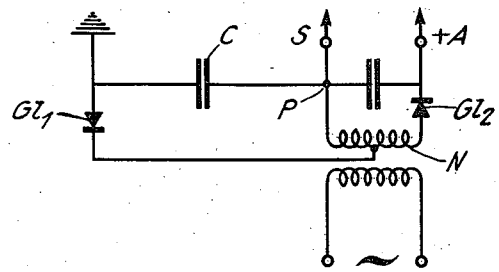

In Fig. 1 the voltage for the screen-grid S of tube R is derived from the voltage divider $Sp$. The current flowing through the latter of necessity is here large compared with the screen-grid current in order that the percentage variations of the screen-grid voltage may be diminished. In the arrangement shown in Fig. 2, the power pack can be constructed of substantially smaller and simpler dimensions. The alternating voltage coming from the network is fed to the rectifiers $Gl_1$ and $Gl_2$ connected in series for D. C., with the interposition of condensers C. The plate receives the potential of the series-connected rectifiers $Gl_1$ and $Gl_2$, whereas the screen-grid S is subject to the potential of the condenser midpoint P. The capacity K and the choke-coil D are provided for smoothing as known in the art. But this circuit scheme is useful only if the screen-grid voltage is exactly, or nearly, half as high as the plate voltage. If the division ratio of the voltage of the auxiliary electrode and the plate voltage is different, then a circuit arrangement must be chosen as shown in Fig. 3. The power pack or network-supply transformer N has a tapped secondary winding. One of the rectifiers, $Gl_2$ receives the full supply-line voltage, whereas the second rectifier $Gl_1$ which is called upon to furnish the screen-grid voltage, is fed with only a fraction of the secondary voltage. The auxiliary-electrode voltage is tapped at the midpoint P of the condenser. In order that different voltage ratios may be feasible it is recommendable to provide the secondary winding with several tappings.

I claim:—

1. In a power supply circuit for amplifier tubes and the like an electronic tube provided with an anode, a cathode, a signal grid and an auxiliary grid, a power transformer including a primary winding, and a secondary winding the primary winding being adapted to be connected to a source of alternating current, a connection from the auxiliary grid electrode to one end of the secondary of said transformer, a connection from the anode of the tube to the other end of said secondary including a choke coil and a rectifier device connected in series in the order named, a connection including a condenser between the grid electrode end of the secondary winding and the anode end of the rectifier, a connection including a condenser between the grid electrode end of the secondary and the cathode of the tube, and a connection including a rectifier device from the cathode side of said last named condenser to the anode end of said secondary, said two rectifiers being poled so that there is formed a direct current path which includes the two rectifier devices in series and the anode-cathode path of the tube and a by-pass condenser connected between the cathode and the anode end of the choke coil.

2. In a power supply circuit for amplifier tubes and the like, an electronic tube provided with an anode, a cathode, a signal grid and an auxiliary grid, a power transformer including a primary and a secondary, the primary being adapted to be connected to a source of alternating current, a connection from one of said grid electrodes to one end of the secondary of said transformer, a connection from the anode of said tube to the other end of said secondary, said last named connection including a rectifier device, a connection including a condenser between the grid electrode side of the secondary winding and the anode end of the rectifier, a connection including a condenser between the grid electrode end of the secondary and the cathode of said tube and a connection including a rectifier device from the cathode side of said last named condenser to a point of the secondary winding intermediate its two ends, said two rectifiers being poled so that there is formed a direct current circuit which includes the two rectifier devices in series and the anode-cathode path of said tube.

3. Apparatus for supplying direct current voltages to electronic tubes requiring a plurality of different voltages from a source of alternating current comprising a loop circuit including a transformer winding, a condenser and a rectifier device all in series, a second circuit comprising a connection from a point of the loop circuit between the condenser and transformer winding and a point of said transformer winding, said second circuit comprising a condenser and a rectifier device in series, a source of alternating current effectively across the transformer winding and taps located between the condenser and the rectifier device of said loop circuit, between the transformer winding and the condenser of said loop circuit and between the condenser and rectifier device of the second circuit.

4. In a power supply circuit, a transformer having primary and secondary sections, means for connecting the primary section to a source of alternating current, a condenser shunted across the secondary section of the transformer through a rectifier device and a second condenser shunted across at least a portion of the secondary section of the transformer through a second rectifier device.

5. In a power supply circuit, a transformer having a primary winding and a secondary winding, a circuit including a rectifier device and a condenser in series shunted across the secondary winding, a circuit including a second condenser and a second rectifier device in series shunted across only a portion of the secondary winding, means for connecting a load across a point of the first mentioned circuit which is between the first-named rectifier device and the condenser and a point of the second named circuit which is between the second named rectifier device and the second-named condenser, said two rectifier devices being connected as respects their polarity so that there is formed a circuit comprising the two rectifier devices and the load through which direct current flows through the load in one direction only and means for connecting a second load circuit across the second-named condenser.

HANS FRIEDRICH.